(12) United States Patent
Crespi et al.

(10) Patent No.: US 11,087,780 B2
(45) Date of Patent: Aug. 10, 2021

(54) ANALOG VOICE ACTIVITY DETECTOR SYSTEMS AND METHODS

(71) Applicant: SYNAPTICS INCORPORATED, San Jose, CA (US)

(72) Inventors: Lorenzo Crespi, Costa Mesa, CA (US); Marco Croce, Orio Litta (IT); Andrea Baschirotto, Tortona (IT); Piero Malcovati, Pavia (IT)

(73) Assignee: SYNAPTICS INCORPORATED, San Jose, CA (US)

( * ) Notice: Subject to any disclaimer, the term of this patent is extended or adjusted under 35 U.S.C. 154(b) by 47 days.

(21) Appl. No.: 16/228,351

(22) Filed: Dec. 20, 2018

(65) Prior Publication Data

US 2019/0198043 A1    Jun. 27, 2019

Related U.S. Application Data

(60) Provisional application No. 62/609,258, filed on Dec. 21, 2017.

(51) Int. Cl.
*G10L 25/84* (2013.01)
*G10L 15/22* (2006.01)
*G10L 25/21* (2013.01)

(52) U.S. Cl.
CPC .............. *G10L 25/84* (2013.01); *G10L 15/22* (2013.01); *G10L 25/21* (2013.01); *G10L 2015/223* (2013.01)

(58) Field of Classification Search
CPC ....... G10L 25/78; G10L 15/22; G10L 19/167; G10L 25/90; G10L 25/84; G10L 15/01; G10L 15/20; G10L 19/008; G10L 19/028; G10L 21/0208; G10L 13/04; G10L 15/07; G10L 15/083; G10L 15/28; G10L 19/06;
(Continued)

(56) References Cited

U.S. PATENT DOCUMENTS 8,972,252 B2 *  3/2015  Hung ................... G06F 1/3215
                                                  704/230
2011/0010172 A1  1/2011  Konchitsky
(Continued)

OTHER PUBLICATIONS

Written Opinion and International Search Report for International App. No. PCT/US2018/066922, 13 pages.

*Primary Examiner* — Linda Wong
(74) *Attorney, Agent, or Firm* — Haynes and Boone, LLP

(57) ABSTRACT

A voice-activity detector (VAD) system comprises a microphone operable to receive and to process audio inputs from an environment to generate an analog audio input signal. The system further comprises an analog VAD operable to process the analog audio input signal to perform an initial detection of human speech, and operable to send a wake up command to a digital signal processing chain to awaken the digital signal processing chain from a sleep mode, when the analog VAD detects human speech. Further, the system comprises the digital signal processing chain operable to process the analog audio input signal to perform a secondary detection of human speech, and operable to output a signal indicating that human speech is detected, when the digital signal processing chain detects human speech. In one or more embodiments, the secondary detection of human speech is more accurate than the initial detection of human speech.

17 Claims, 9 Drawing Sheets

(58) Field of Classification Search
CPC ..... G10L 21/02; G10L 21/0216; G10L 25/93; G10L 15/10; G10L 17/00; G10L 25/21; G10L 2015/223; G06F 1/3262; G06F 3/0433; G06F 3/16; G06F 3/165; G06F 3/167; H03H 19/004
See application file for complete search history.

(56) References Cited

U.S. PATENT DOCUMENTS

| | | | |
|---|---|---|---|
| 2014/0024323 A1* | 1/2014 | Clevorn | H04W 52/0229 |
| | | | 455/83 |
| 2015/0317980 A1* | 11/2015 | Vermeulen | G10L 15/22 |
| | | | 704/225 |
| 2015/0372663 A1* | 12/2015 | Yang | H03H 11/28 |
| | | | 327/551 |
| 2017/0133041 A1 | 5/2017 | Mortensen et al. | |
| 2017/0178668 A1 | 6/2017 | Kar et al. | |
| 2017/0263268 A1* | 9/2017 | Rumberg | G10L 15/02 |
| 2019/0147856 A1* | 5/2019 | Price | G06N 3/063 |
| | | | 704/232 |
| 2020/0035212 A1* | 1/2020 | Yamabe | G10L 21/0224 |

\* cited by examiner

ANALOG VOICE ACTIVITY DETECTOR SYSTEMS AND METHODS

CROSS-REFERENCE TO RELATED APPLICATIONS

The present application claims the benefit of and priority to U.S. Provisional Patent Application No. 62/609,258, filed Dec. 21, 2017, which is hereby incorporated by reference in its entirety.

TECHNICAL FIELD

The present disclosure, in accordance with one or more embodiments, relates generally to audio signal processing, and more particularly for example, to detecting voice activity in low power environments.

BACKGROUND

Voice-controlled devices, such as battery-powered hearable devices, have gained popularity in recent years. These devices typically receive audio through a microphone and then process the received audio input to detect human speech. Speech detection is often performed by a digital signal processor. For devices that require a "wake-on-voice" functionality, continual detection of speech in the received audio input may consume a significant amount of power in a low power device. It is desirable to minimize the power consumption in this always-on state, including minimizing the use of the digital signal processor. There is therefore a continued need for improved systems and methods for voice activity detection that allow for a reduction in power consumption.

SUMMARY

A voice-activity detector (VAD) system comprises a microphone operable to receive and to process audio inputs from an environment to generate an analog audio input signal. The system further comprises an analog VAD operable to process the analog audio input signal to perform an initial detection of human speech, and operable to send a wake up command to a digital signal processing chain to awaken the digital signal processing chain from a sleep mode, when the analog VAD detects human speech. Further, the system comprises the digital signal processing chain operable to process the analog audio input signal to perform a secondary detection of human speech, and operable to output a signal indicating that human speech is detected, when the digital signal processing chain detects human speech. In one or more embodiments, the secondary detection of human speech may be more robust than the initial analog VAD detection.

The scope of the present disclosure is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The present disclosure provides improves methods and systems for voice activity detection, which may be used, for example, in low power voice-controlled devices (e.g., hearables, smart headphones, hearing aids, Bluetooth headphones, and smart speakers) that provide "wake-on-voice" functionality. Human speech is typically detected by performing digital signal processing of sensed audio input. However, the continual use of a digital signal processor in this always-on state consumes a significant amount of power (e.g., typically in the milliwatt range (mW)) available to the low power device. It is desirable to minimize the use of the digital signal processor and, thus, the power consumed during voice activity detection.

In various embodiments of the present disclosure, a system includes a low-power analog voice activity detection stage to provide voice activity detection while the system digital processor components are in a sleep mode or other low power mode. In one or more embodiments, an audio input signal received from a device microphone is processed by a low-power analog stage, which performs a rough signal analysis. This low-power analog stage awakens a digital signal processing chain to perform digital signal processing of the audio input, if a signal compatible with human speech is detected. In one or more embodiments, the low-power analog stage operates as analog voice activity detector (VAD) and is implemented with low power analog circuits. Using low power analog circuits, power consumption in the nanowatt (nW) range can be achieved. The analog VAD circuitry may include band-limiting circuitry, circuitry for computing signal energy of the audio input signal within a time window, and circuitry operable to receive the sequence of signal energy values and discriminate between ambient noise and human speech.

The present disclosure may be used with conventional solutions that minimize power consumption in voice activity detection devices by optimizing the power consumption in the digital signal processing chain. For example, power reduction in the digital signal processing chain may be achieved by lowering the bias currents and sample rate in the pre-amplifier and analog-to-digital converter (ADC) blocks of the digital signal processing chain, and by using advanced technology nodes, power islands, and low-power design techniques for the digital signal processor (DSP). Additional power savings can be achieved by implementing the analog VAD circuitry disclosed herein.

Figure 1:
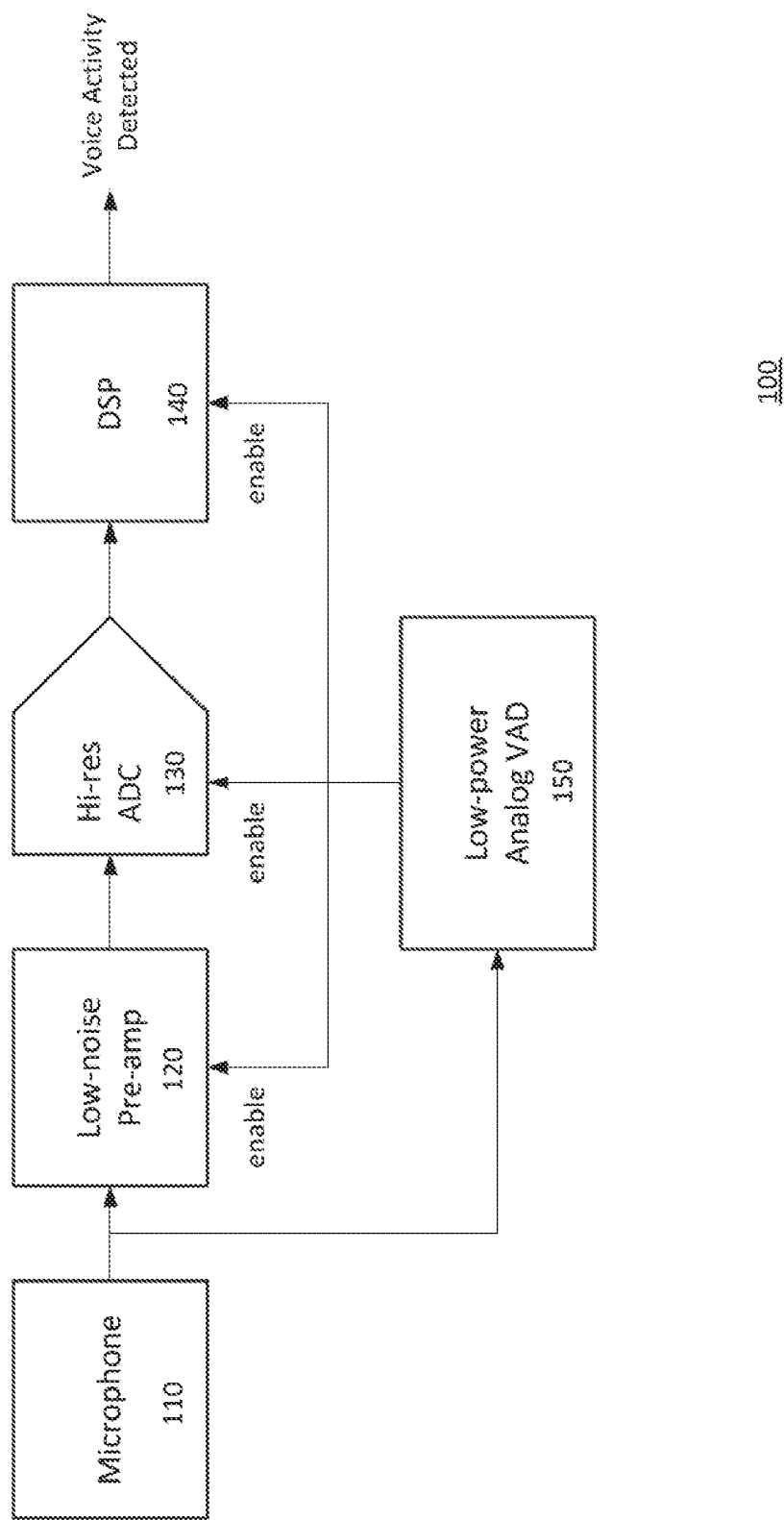
FIG. 1 is a diagram illustrating a voice activity detection system, in accordance with one or more embodiments.

Referring to FIG. 1, a voice activity detector (VAD) system 100 in accordance with one or more embodiments will be described. As illustrated, the VAD system 100 includes a microphone 110, a digital signal processor (DSP) chain, and a low-power analog VAD 150. The DSP chain includes a low-noise pre-amplifier 120, a high-resolution analog-to-digital converter (ADC) 130, and a DSP 140.

The VAD system 100 may be implemented in any device that utilizes voice activity detection. In one embodiment, the VAD system 100 is implemented in a voice-controlled device (e.g., hearables, smart headphones, hearing aids, Bluetooth headphones, and smart speakers) that receives an audio input signal and processes detected human speech. In a low-power mode (e.g., a sleep mode) the VAD system 100 may utilize the low-power analog VAD 150 for continuous detection of environmental voice activity. While the analog VAD 150 is processing the received audio, the DSP chain may be in a sleep mode to conserve power. After the low-power analog VAD 150 detects human speech within the received audio, the DSP chain is awakened from sleep mode by the low-power analog VAD 150, to further process the audio to validate whether the audio does indeed include human speech. In various embodiments, the low-power analog VAD 150 performs an initial rough detection of human speech, and the DSP chain performs a more robust voice detection process.

The microphone 110 comprises one or more sensors, each of which may be implemented, for example, as a transducer that converts audio inputs in the form of sound waves into an analog audio signal. In the illustrated embodiment, the microphone 110 generates an analog audio input signal, which is provided to the low-power analog VAD 150 and to the low-noise pre-amplifier 120 of the DSP chain.

The low-power analog VAD 150 is operable to perform a rough detection of human speech using analog circuitry. In various embodiments, the analog VAD 150 detects human speech by band-limiting the analog audio input signal, computing signal energy within a given time window, and using the sequence of computed energy values, discriminating between ambient noise and human speech. Embodiments of various components of the VAD 150 are illustrated in FIGS. 2-6 and discussed further, below. The analog VAD 150 is further operable to generate an enable signal to awaken the DSP chain (e.g., the low-noise pre-amplifier 120, the high-resolution ADC 130, and the DSP 140 of FIG. 1) when the analog VAD 150 detects human speech in the input audio signal.

The low-noise pre-amplifier 120 is operable to amplify the analog audio input signal to generate an amplified analog audio signal with low noise. The low-noise pre-amplifier 120 provides the amplified analog audio signal to the high-resolution ADC 130. The high-resolution ADC 130 is operable to convert the analog audio input signal into a digital audio signal, which is provided to the DSP 140.

The DSP 140 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. For example, the DSP 140 may include a digital signal processing module, which may represent any suitable combination of hardware components and software instructions, configured to perform various operations as further discussed herein. The DSP 140 is operable to receive the digital audio signal and detect whether the digital audio signal includes human speech.

During operation, the DSP chain (e.g., the low-noise pre-amplifier 120, the high-resolution ADC 130, and the DSP 140 of FIG. 1) enters a sleep mode or other low power mode during an inactive state to conserve power. During the sleep mode, the microphone 110 and low-power analog VAD 150 receive and process the analog audio signal to detect voice activity. The microphone 110 receives audio inputs from the environment. At least one sensor within the microphone 110 converts the received sound waves into an analog audio signal, which is provided to the low-power analog VAD 150. The analog VAD 150 analyzes the received analog audio input signal to detect the presence of human speech. After the analog VAD 150 detects human speech, the analog VAD 150 sends enable commands to the low-noise pre-amplifier 120, the high-resolution ADC 130, and the DSP 140 to awaken the DSP chain for further voice processing.

After the DSP 140 is awakened from the sleep mode, the low-noise pre-amplifier amplifies the received analog audio input signal to generate an amplified analog audio signal with low noise, which is provided to the high-resolution ADC 130. After the high-resolution ADC 130 receives the amplified analog audio signal, the high-resolution ADC 130 converts the amplified analog audio signal to a digital audio signal, which is provided to the DSP 140. After the DSP 140 receives the digital audio signal, the DSP 140 processes the digital audio signal to determine if the audio inputs from the environment include human speech. When the DSP 140 detects human speech, the DSP 140 may output a signal indicating that voice activity is detected. In various embodiments, the output signal may be received by a host system or host device that uses the detected speech for voice processing.

Figure 2:
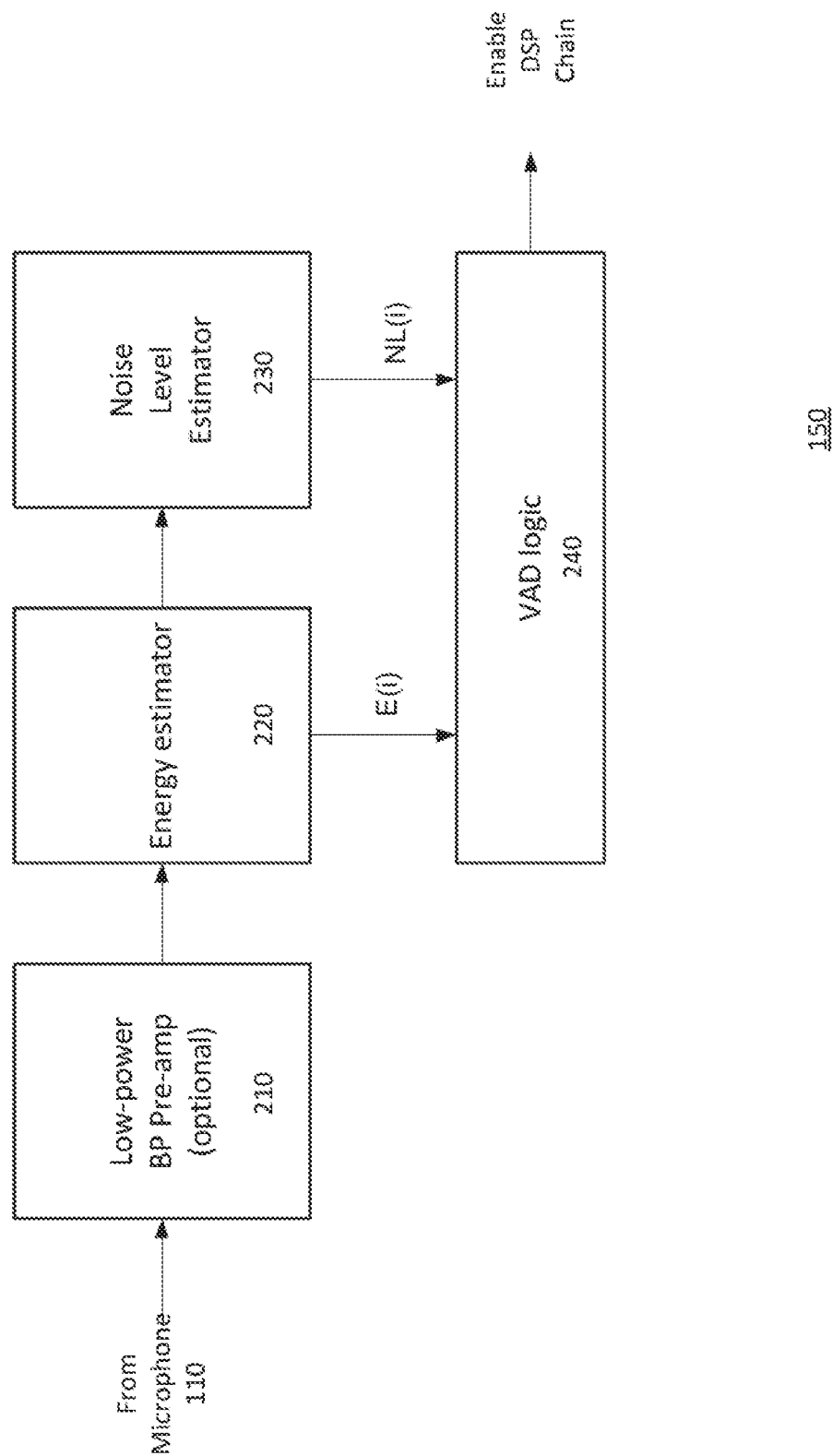
FIG. 2 is a diagram illustrating an analog voice activity detector that may be employed by the voice activity detection system of FIG. 1, in accordance with one or more embodiments.

Referring to FIG. 2, an analog VAD 150 that may be employed by the VAD system 100 of FIG. 1, in accordance with one or more embodiments, will be described. As illustrated, the analog VAD 150 includes an optional low-power bandpass (BP) pre-amplifier 210, an energy estimator 220, a noise level estimator 230, and VAD logic 240.

In at least one embodiment, the analog VAD 150 processes the audio input signal to perform a rough detection of human speech. The low-power BP pre-amplifier 210 of the analog VAD 150 is operable to provide direct current (DC) decoupling from the microphone 110 (refer to FIG. 1). The low-power BP pre-amplifier 210 is further operable to band-limit and amplify the analog audio input signal from the microphone 110 to generate a band-limited amplified analog audio signal, which is provided to the energy estimator 220. In addition, the low-power BP pre-amplifier 210 may be operable to provide single-ended to differential conversion to the analog audio input signal. The low-power BP pre-amplifier 210 may be implemented by various circuitry components including, but not limited to, an active resistor-capacitor (RC) circuit (e.g., refer to FIG. 3), a gm-C circuit, and a passive RC circuit. In at least one embodiment, the low-power BP pre-amplifier 210 may be omitted if the microphone 110 provides sufficient signal strength.

Figure 4A:
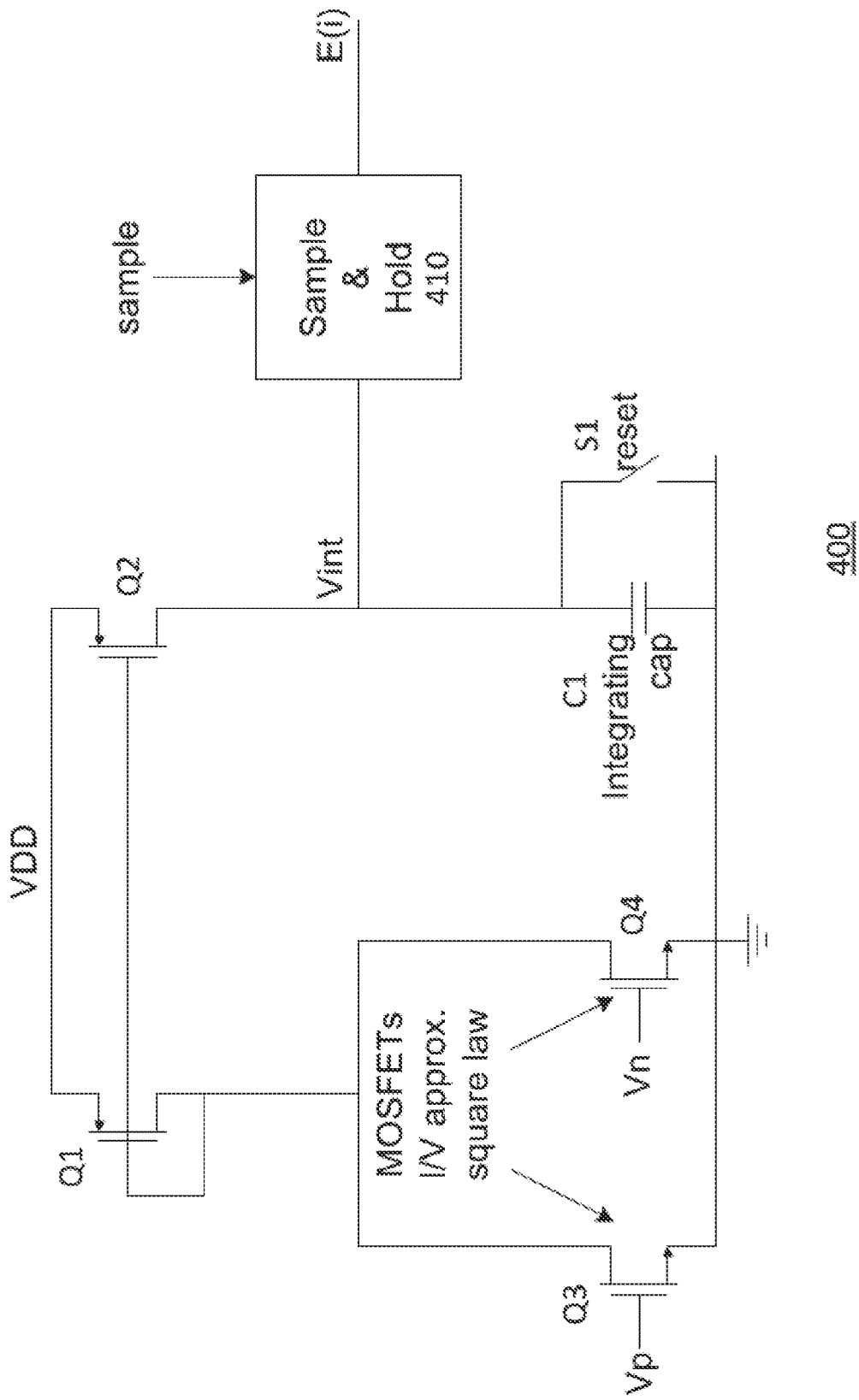
FIG. 4A is a diagram illustrating energy estimator circuitry that may be employed by the energy estimator of the analog voice activity detector of FIG. 2, in accordance with one or more embodiments.

The energy estimator 220 is operable to calculate the energy level of the band-limited amplified analog audio signal received from the low-power BP pre-amplifier 210 (or, in embodiments with the low-power BP pre-amplifier 210 omitted, the analog audio input signal received directly from the microphone 110). The energy estimator may be implemented by various circuitry including, but not limited to, MOSFET transistors as illustrated in FIG. 4A. The energy estimator 220 calculates the energy of the signal by generating a voltage sample E(i) at the end of an integration period. The voltage sample E(i) is proportional to the root-mean-square (RMS) energy of the signal within the integration period. For this calculation, the energy estimator 220 performs a continuous-time nonlinear operation on the band-limited amplified analog audio signal (or the analog audio input signal). Various different types of transfer functions may be utilized for this continuous-time nonlinear operation including, but not limited to, a square law transfer function as illustrated in FIG. 4A and the accompanying description, below, and an absolute value transfer function. The voltage samples E(i) are provided to the noise level estimator 230 and the VAD logic 240.

Figure 5:
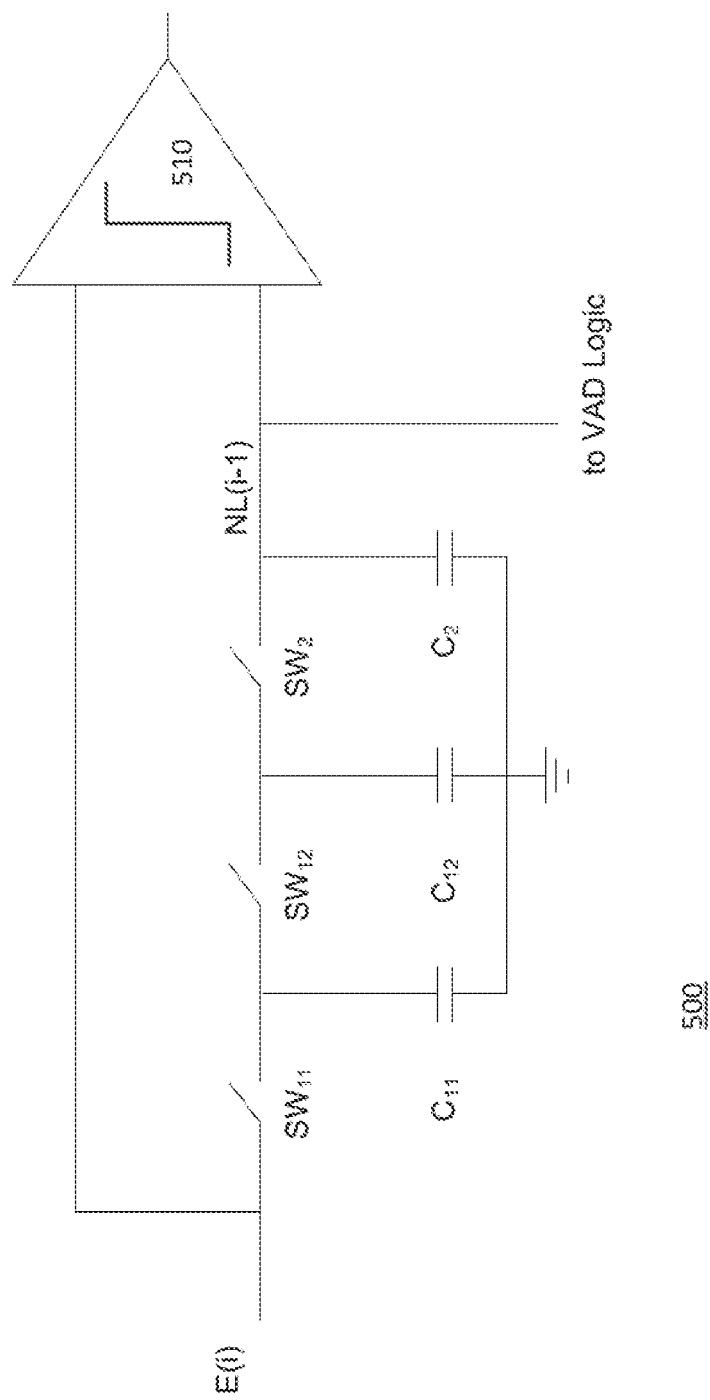
FIG. 5 is a diagram illustrating noise level estimator circuitry that may be employed by the noise level estimator of the analog voice activity detector of FIG. 2, in accordance with one or more embodiments.

The noise level estimator 230 is operable to calculate an estimation of the signal-to-noise (SNR) level of the voltage samples E(i) received from energy estimator 220. The noise level estimator 230 processes E(i) in the discrete-time domain to evaluate its SNR level and to obtain an updated noise level NL(i), which are provided to the VAD logic 240. In one embodiment, this processing includes linear manipulation of E(i), which is suitable for the implementation with a passive switched-capacitors network followed by a comparator as illustrated in FIG. 5. This switched-capacitor network can also be designed to implement a programmable coefficient, which allows for adapting the VAD operation to different applications. The noise level estimator 230 may be implemented by various circuitries including, but not limited to, the exemplary circuitry depicted in FIG. 5.

Figure 6:
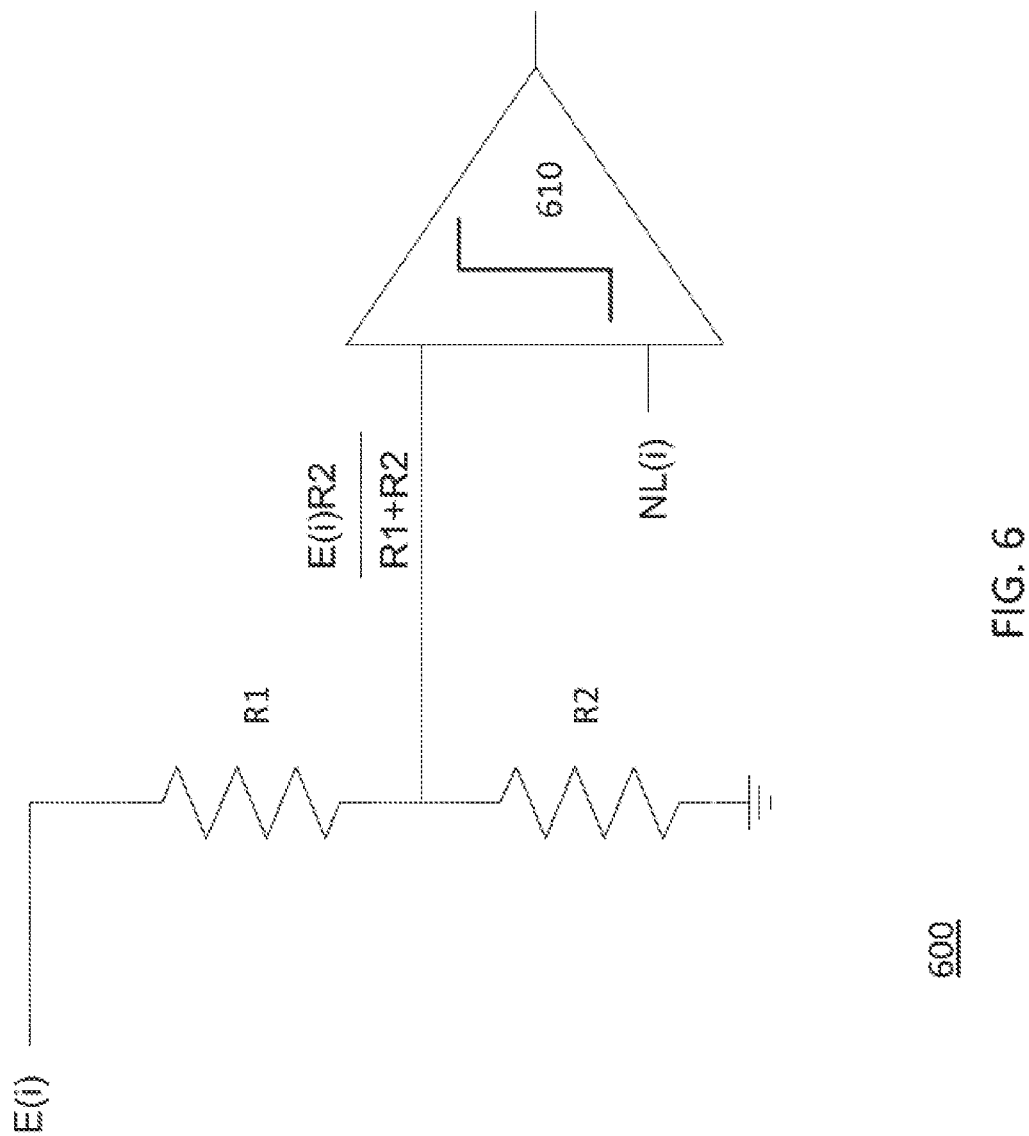
FIG. 6 is a diagram illustrating voice activity detection logic circuitry that may be employed by the voice activity detection logic of the analog voice activity detector of FIG. 2, in accordance with one or more embodiments.

The VAD logic 240 may comprise various different types of logic circuitry to perform various operations discussed herein for embodiments of the disclosure. In various embodiments, the VAD logic 240 comprises logic circuitry to receive the voltage samples E(i) from the energy estimator 220 and noise levels NL(i) from the noise level estimator 230, and generate a signal indicating whether voice activity is present in the audio input signal. In the illustrated embodiment, the VAD logic 240 detects a likelihood of the presence of human speech, and outputs one or more enable commands, which are sent to the low-noise pre-amplifier 120, the high-resolution ADC 130, and the DSP 140 of FIG. 1 to awaken the DSP chain. The VAD logic 240 may be implemented by various different circuitry including, but not limited to, the exemplary circuitry comprising a voltage divider and a comparator as depicted in FIG. 6.

In one embodiment, the VAD logic 240 compares a signal processing threshold, $th_{sp}$ with a signal to noise ratio computed of E(i) and NL(i), such that speech is identified if the signal-to-noise ratio is greater than the threshold, $th_{sp}$:

$$SNR = \frac{E(i) - NL(i)}{NL(i)} > th_{sp}$$

This equation may be simplified as follows:

$$\frac{E(i)}{th_{sp} + 1} > NL(i)$$

The VAD logic 240 includes circuitry for receiving E(i), NL(i), and the threshold $th_{sp}$, and implementing the simplified equation. In various embodiments, the threshold $th_{sp}$ may be set with a variable capacitance array, the division operation may be implemented with a voltage divider, and a comparator may be implemented to compare the division result with NL(i) and generate a signal indicating whether speech is present. The threshold $th_{sp}$ may be chosen by an empirical method by tuning the system for a desired sensitivity, and may fixed for a given application.

Figure 3:
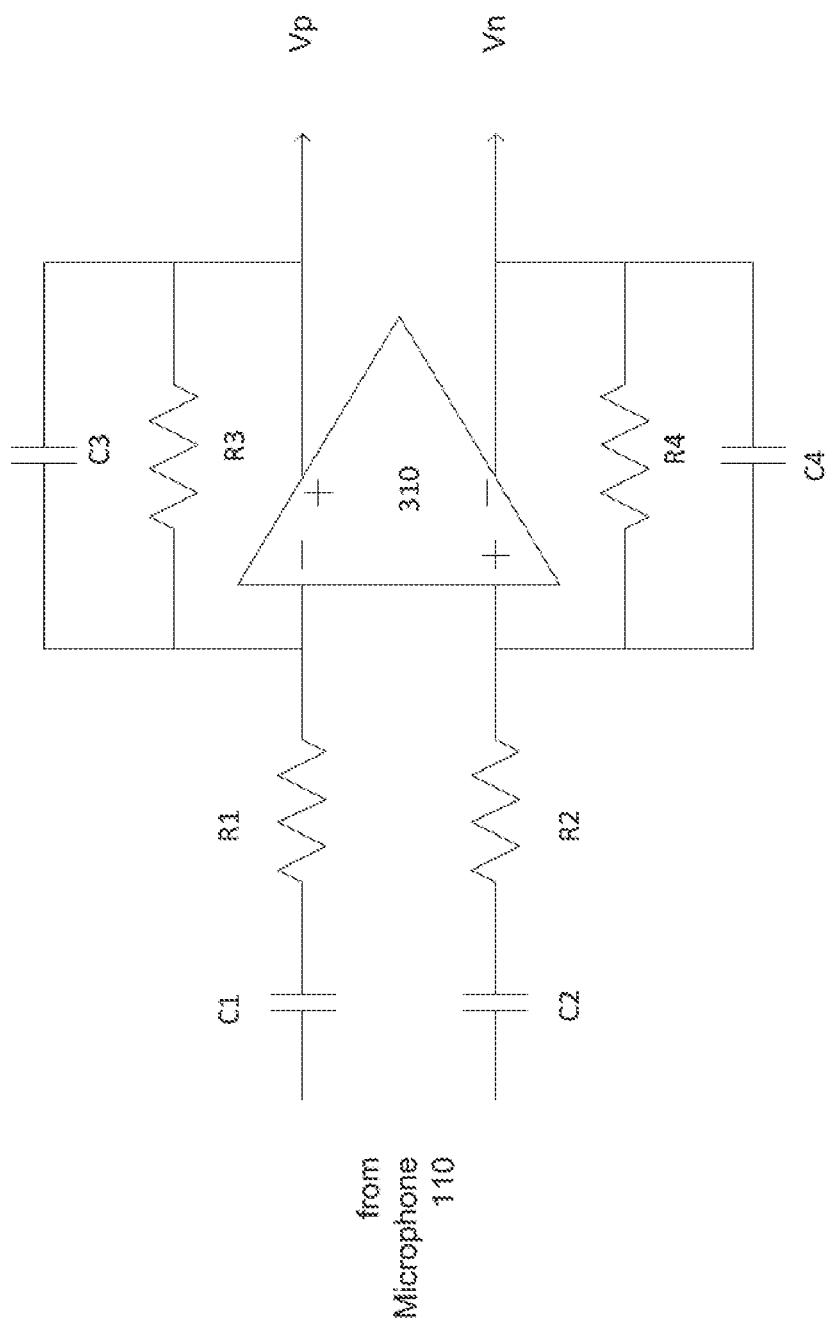
FIG. 3 is a diagram illustrating a low-power bandpass pre-amplifier circuitry that may be employed by the low-power bandpass (BP) pre-amplifier of the analog voice activity detector of FIG. 2, in accordance with one or more embodiments.

FIG. 3 illustrates an embodiment of a low-power bandpass (BP) pre-amplifier circuitry 300 that may be employed by the low-power bandpass (BP) pre-amplifier 210 of the analog VAD 150 of FIG. 2. The low-power bandpass (BP) pre-amplifier circuitry 300 forms an active RC circuit. As illustrated, the low-power bandpass (BP) pre-amplifier circuitry 300 includes four capacitors (C1, C2, C3, C4), four resistors (R1, R2, R3, R4), and a comparator 310. The low-power bandpass (BP) pre-amplifier circuitry 300 operates by band-limiting and amplifying the analog audio input signal from the microphone 110 to generate a band-limited amplified analog audio signal across the Vp and Vn nodes.

FIG. 4A illustrates energy estimator circuitry 400 that may be employed by the energy estimator 200 of the analog VAD 150 of FIG. 2, in accordance with one or more embodiments. As illustrated, the energy estimator circuitry 400 includes four MOSFET transistors (Q1, Q2, Q3, Q4), an integrating capacitor C1, a reset switch S1, and a sample and hold circuit 410. The energy estimator circuitry 400 operates by calculating the amount of energy carried by the band-limited amplified analog audio signal (or, in embodiments without the low-power BP pre-amplifier, the analog audio input signal). The energy estimator circuitry 400 achieves this by taking advantage of a MOSFET transistor characteristic square law, where the square of the signal is generated by a MOSFET transistor differential pair structure (e.g., Q3 and Q4). The generated squared signal is injected in current mode into the integrating capacitor C1, which integrates the squared signal over an integration period and holds the charge. The integration period is reset by the switching of the reset switch S1. When the reset switch S1 is switched, the integrating capacitor C1 stops integrating the squared signal, and the charge held on the integrating capacitor C1 is cleared. Additional logic circuitry (not shown) generates a periodic signal (e.g., refer to graph 430 of FIG. 4B) that controls the reset switch S1.

At the end of each integration period (e.g., refer to FIG. 4B), the energy estimator circuitry 400 generates a voltage sample E(i), which is proportional to the root-mean-square (RMS) energy of the signal within the integration period. A sample signal (e.g., refer to graph 420 of FIG. 4B) is inputted into the sample and hold circuit 410, which samples and holds the generated voltage samples E(i) accordingly.

Additional logic circuitry (not shown) generates the sample signal (e.g., refer to graph 420 of FIG. 4B) for the sample and hold circuit 410.

Figure 4B:
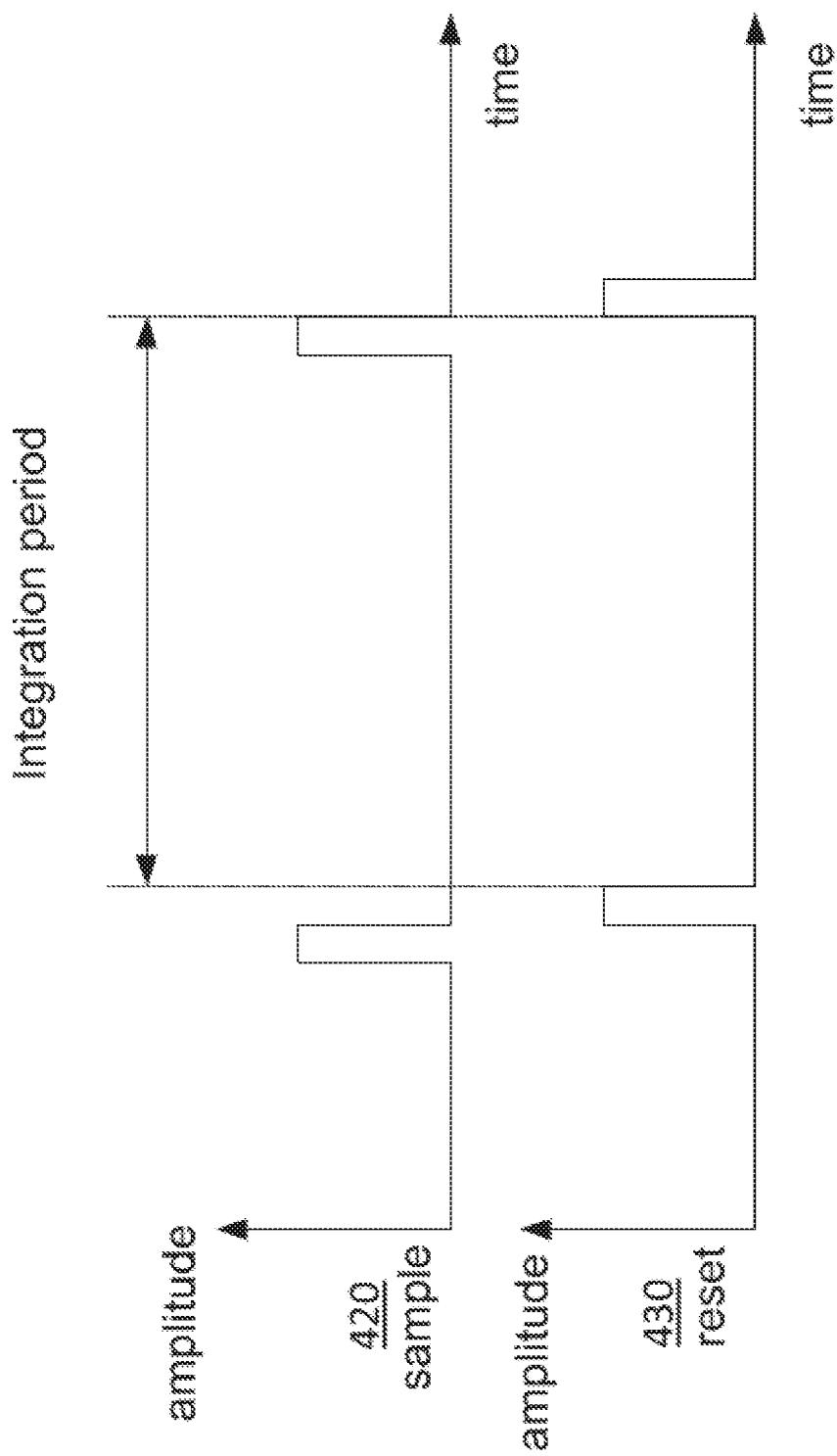
FIG. 4B is a diagram illustrating an integration period of the energy estimator circuitry of FIG. 4A, in accordance with one or more embodiments.

FIG. 4B illustrates the integration period of the energy estimator circuitry 400 of FIG. 4A, in accordance with one or more embodiments. As illustrated, the diagram includes a graph 420 showing a sample signal, and a graph 430 showing a reset signal. The x-axis denotes time and the y-axis denotes amplitude for both of the graphs 420, 430. The integration period is shown to begin at the time of the falling edge of the reset signal, and to end at the time of the rising edge of the reset signal. Over the duration of the integration period, the integrating capacitor C1 (refer to FIG. 4A) integrates the generated squared signal. At the end of the integration period, the integrating capacitor C1 holds the resultant voltage. The amplitude of the voltage is sampled (i.e. the voltage sample E(i) is generated) at the end of the integration period.

Referring to FIG. 5, a diagram illustrating noise level estimator circuitry 500 that may be employed by the noise level estimator 230 of the analog VAD 150 of FIG. 2, in accordance with one or more embodiments, will be described. As illustrated, the noise level estimator circuitry 500 includes three capacitors ($C_{11}$, $C_{12}$, $C_2$), three switches ($SW_{11}$, $SW_{12}$, $SW_2$), and a comparator 510. The noise level estimator circuitry 500 receives the voltage sample E(i) in the discrete-time domain and evaluates its SNR level. The noise level circuitry 500 is operable to determine whether the voltage sample E(i) is higher than or lower than the previous noise level (i.e. NL(i−1)). If the voltage sample E(i) is higher than the previous noise level, the noise level circuitry 500 will raise the noise level at a first predetermined rate. If the voltage sample E(i) is lower than the previous noise level, the noise level circuitry 500 will lower the noise level at a second predetermined rate. In one embodiment, the second predetermined rate is faster than the first predetermined rate, allowing the noise floor to respond to lower noise levels at a faster rate.

During operation, the noise level estimator circuitry 500 operates in two phases (i.e. phase 1 and phase 2). During phase 1, switch $SW_2$ is open and switches $SW_{11}$ and $SW_{12}$ are closed, the noise level estimate circuitry 500 receives the voltage sample E(i) from sample and hold circuitry 410, and capacitor $C_2$ holds the current noise level voltage NL(i−1). Also during phase 1, capacitors $C_{11}$ and $C_{12}$ are charged to voltage E(i).

During phase 2, switch $SW_{11}$ is open and the comparator 510 compares E(i) with the noise level NL(i−1). If the comparator 510 determines that E(i) is less than the current noise floor (i.e. E(i)<NL(i−1)), then the comparator 510 outputs a resultant signal (e.g., a "0" signal indicating that the voltage sample E(i) is less than the noise), to open switch $SW_{12}$ and close $SW_2$ (e.g., through switching logical circuitry). This places capacitor $C_{12}$ in parallel with capacitor $C_2$, and the voltage on capacitor $C_2$ becomes NL(i)=NL(i−1)*$C_2$/($C_{12}$+$C_2$)+E(i)*$C_{12}$/($C_{12}$+$C_2$), which is provided to the VAD logic for further processing.

However, if the comparator 510 determines that E(i) is greater than the noise floor (i.e. E(i)>NL(i−1)), then the comparator 510 outputs a resultant signal (e.g., a "1" signal indicating that the voltage sample E(i) is greater than the noise), to keep switch $SW_{12}$ closed and close switch $SW_2$. This places capacitor $C_{11}$ and capacitor $C_{12}$ in parallel with capacitor $C_2$, and the voltage on capacitor $C_2$ becomes NL(i)=NL(i−1)*$C_2$/($C_{11}$+$C_{12}$+$C_2$)+E(i)*($C_{11}$+$C_{12}$)/($C_{11}$+$C_{12}$+$C_2$), which is provided to the VAD logic for further processing.

Referring to FIG. 6, a diagram illustrating VAD logic circuitry 600 that may be employed by the VAD logic 240 of FIG. 2, in accordance with one or more embodiments, will be described. As previously discussed above, the VAD logic 240 compares the signal processing threshold, $th_{sp}$ with the voltage sample E(i) received from the energy estimator circuitry 400 of FIG. 4A, and the noise level NL(i) received from the noise level estimator circuitry 500, such that speech is identified if the signal-to-noise ratio is greater than the threshold, $th_{sp}$:

$$SNR = \frac{E(i) - NL(i)}{NL(i)} > th_{sp}$$

The equation may be simplified as follows:

$$\frac{E(i)}{th_{sp} + 1} > NL(i)$$

As illustrated in FIG. 6, the VAD logic circuitry 600 may include a voltage divider formed by two resistors (R1, R2) and a comparator 610. In one embodiment, the value of resistor R1 is chosen to be equivalent to $th_{sp}$ ohms (Ω), and the value of resistor R2 is chosen to be equivalent to approximately one (1) ohm. During operation, the voltage divider receives the voltage sample E(i), and the voltage is divided across the resistors (R1, R2) to produce a voltage of E(i)/($th_{sp}$+1), which is provided to the comparator 610. The comparator 610 compares E(i)/($th_{sp}$+1) to the noise level NL(i) received from the noise level estimator circuitry 500. If the comparator 610 determines that E(i)/($th_{sp}$+1) is greater than the noise level NL(i), then the comparator 610 will output one or more enable commands (e.g., a "1" signal indicating that human speech is detected), to wake up the digital signal processing chain. In one embodiment, the enable command is provided to the low-noise pre-amplifier 120, the high-resolution ADC 130, and the DSP 140 of FIG. 1 to awaken the DSP chain. However, if the comparator 610 determines that E(i)/($th_{sp}$+1) is less than or equal to the noise level NL(i), then the comparator will output one or more null commands (e.g. a "0" signal indicating that human speech is not detected), and the DSP chain will remain in a low power or sleep mode.

Figure 7:
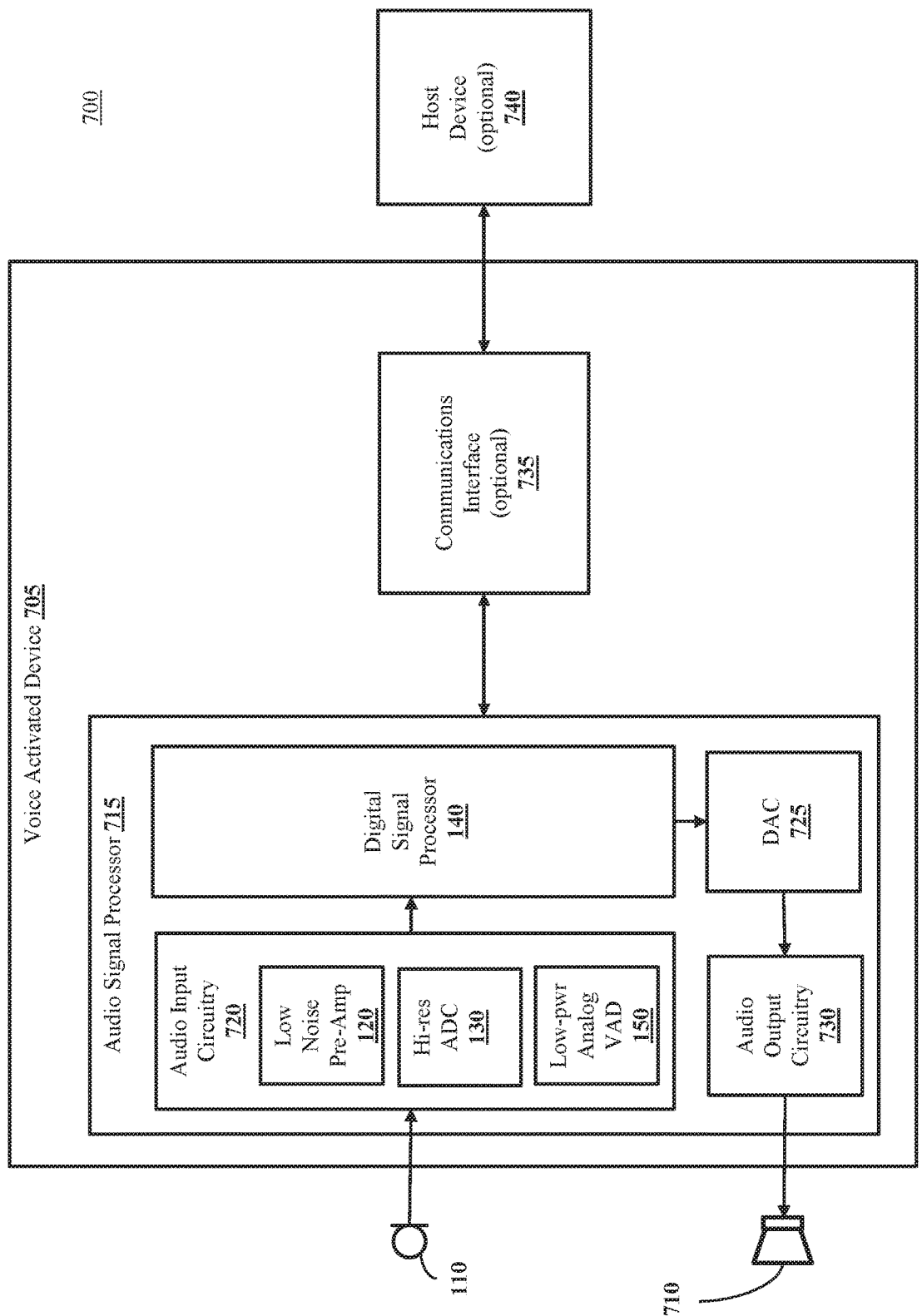
FIG. 7 is a diagram illustrating an audio processing system, in accordance with one or more embodiments.

Referring to FIG. 7, an embodiment of an audio processing system 700 implementing the analog VAD of the present disclosure will be described. As illustrated, the audio processing system 700 includes a microphone 110, a voice activated device 705, a speaker 710, and an optional host device 740. The voice activated device 705 includes an audio signal processor 715 and an optional communications interface 735. The audio signal processor 715 includes audio input circuitry 720, a digital signal processor (DSP) 140, a digital-to-analog converter (DAC) 725, and audio output circuitry 730. The audio input circuitry includes a low-noise pre-amplifier 120, a high-resolution analog-to-digital converter (ADC) 130, and a low-power analog VAD 150 of the present disclosure.

In one embodiment, the voice activated device 705 is a voice-controlled device that processes audio to detect human speech. Various different types of voice-controlled devices may be employed for the voice activated device 705 including, but not limited to, a hearable, a smart headphone, a hearing aid, a Bluetooth headphone, and a smart speaker. The voice activated device 705 uses the low-power analog VAD 150 to perform an initial rough detection of human speech. While the analog VAD 150 is processing the received audio, the DSP 140, the low-noise pre-amplifier 120, and the high-resolution ADC 130 may be placed in a sleep mode or other low power mode to conserve power. After the low-power analog VAD 150 detects human speech within the received audio, the DSP 140, the low-noise pre-amplifier 120, and the high-resolution ADC 130 are awakened from sleep mode by the low-power analog VAD, to perform further voice processing of the audio input signal. For example, in one embodiment the DSP 140 is operable to detect a trigger word or phrase in the audio input signal. After human speech is detected, the communications interface 735 facilitates communications between the DSP 140 and other processing components of the voice activate device 705 or a separate host device 740 (e.g., a smart phone). The DSP 140 may transmit voice commands received at the microphone 110 to the host device 740 and receive audio signals for processing by the DSP 140 for output to the speaker 710 through DAC 725 and audio output circuitry 730.

The microphone 110 may comprise one or more sensors, each of which may be implemented as a transducer that converts audio inputs in the form of sound waves into an analog audio signal (i.e. audio samples). In one embodiment, the microphone 110 generates an analog audio input signal, which is provided to the low-power analog VAD 150 and to the low-noise pre-amplifier 120. The low-power analog VAD 150 is operable to perform an initial rough detection of human speech as described herein. When the analog VAD 150 detects human speech, the analog VAD 150 is further operable to enable (i.e. awaken) the low-noise pre-amplifier 120, the high-resolution ADC 130, and the DSP 140.

The host device 740 is operable to receive audio input signals from the voice activated device 705 and generate audio output signals for output through the speaker 710. Various different types of devices may be employed by the host device 740 including, but not limited, to a smart phone, a tablet, a laptop computer, a desktop computer, a server, a voice-controlled appliance, and a vehicle. In one embodiment, the voice activated device is a headset and the host device is a smart phone operable to provide hands free operation through voice command processing. In some embodiments, the audio processing system 700 may operate as a standalone device without a host device 740.

The communications interface 735 facilitates communication of data between the audio signal processor 715 and the host device 740. For example, the communications interface 735 may enable Wi-Fi (e.g., 802.11), Bluetooth, USB or other communications connections between the audio signal processor 715 and the host device 740. In various embodiments, the communications interface 735 may include other wired and wireless communications components facilitating direct or indirect communications between the audio signal processor 715 and the host device 740. In various embodiments, the communications interface 735 may facilitate communications with other processing components of the voice activate device 705.

The DAC 725 is operable to convert data in the form of digital audio signals received by the DSP 140 into analog audio signals, which are provided to the audio output circuitry 730. The audio output circuitry 730 processes analog audio signals received from the DAC 725 for output to the speaker 710. In various embodiments, the audio output circuitry 730 may include an amplifier for amplifying the analog audio signals to drive the speaker 710.

Figure 8:
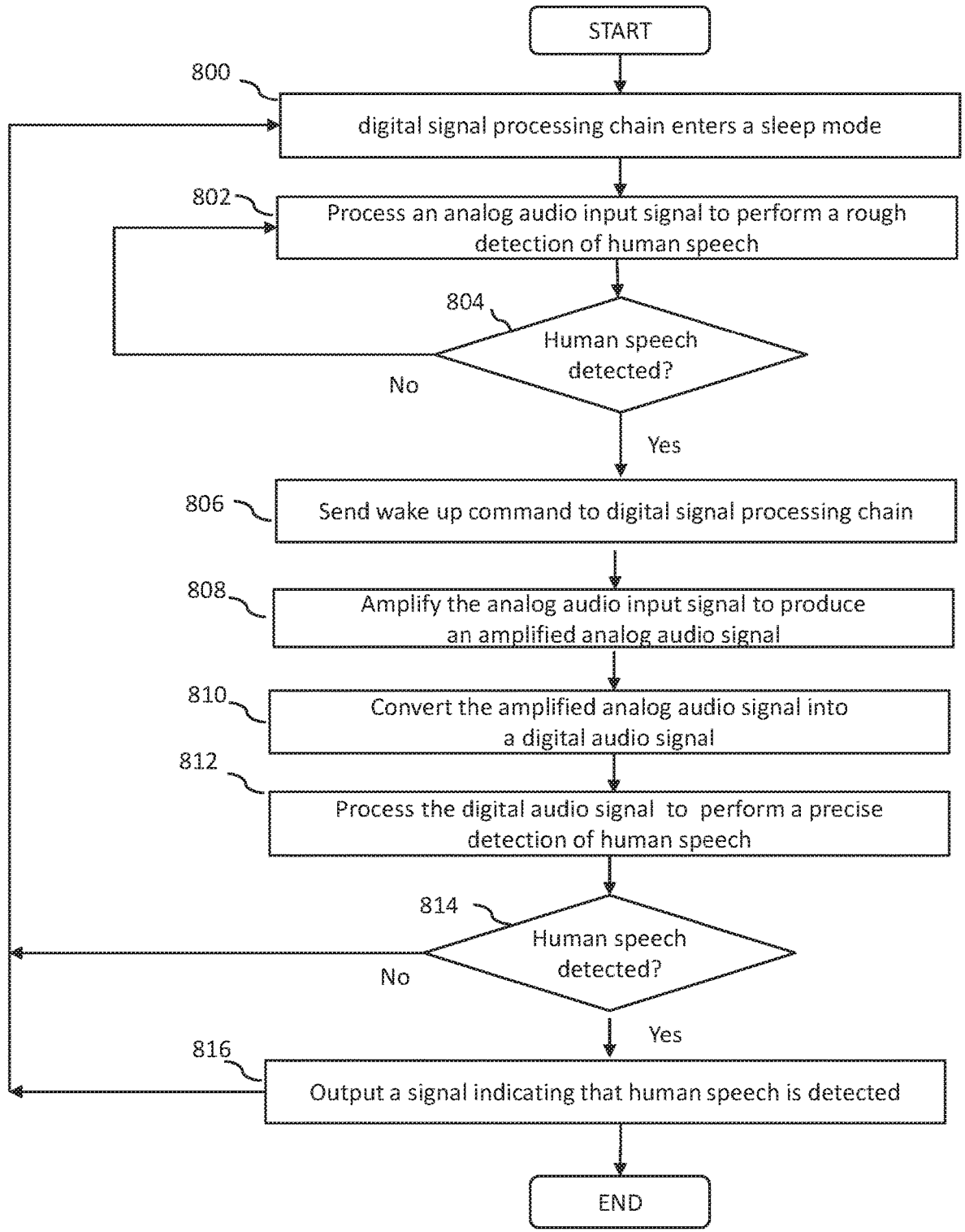
FIG. 8 is a flow chart illustrating an operation of the voice activity detection system of FIG. 1, in accordance with one or more embodiments.

FIG. 8 is a flow chart illustrating an operation of the voice activity detector (VAD) system 100 of FIG. 1, in accordance with one or more embodiments. In some embodiments, the method may be performed by one or more components in the VAD system 100 of FIG. 1. At the start of the method, a digital processing chain (i.e. comprising a low-noise pre-amplifier, a high-resolution ADC, and a DSP) enters a sleep mode 800. During the sleep mode, an analog audio input signal is processed by a low-power analog VAD to perform a rough detection of human speech in step 802. The analog VAD determines whether human speech is detected in step 804.

If the analog VAD determines that human speech is detected, then the analog VAD sends a wake up command to the digital signal processing chain in step 806. The low-noise pre-amplifier amplifies the analog audio input signal to produce an amplified analog audio signal in step 808. The ADC then converts the amplified analog audio signal into a digital audio signal in step 810. The DSP processes the digital audio signal to perform additional detection of human speech in step 812 in accordance with system requirements. In one embodiment, the DSP detects a trigger word. In another embodiment, the DSP provides a more robust analysis and processing of the audio input signal for input processing. The DSP determines whether human speech is detected in step 814 in accordance with system requirements. If the DSP determines that human speech is not detected, then the method proceeds to step 800. However, if the DSP determines that human speech is detected, then the DSP outputs a signal indicating that human speech is detected in step 816 and processing of the audio input signal continues.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
receiving an analog audio input signal;
processing, by an analog voice activity detector, the analog audio input signal to determine whether the analog audio input signal includes speech;
generating, by the analog voice activity detector, a wake up signal to a digital signal processing chain if the analog audio input signal is determined to include speech, the wake up signal notifying the digital signal processing chain to wake from a sleep mode;
converting, by an analog to digital converter of the digital signal processing chain, the analog audio input signal to a digital audio input signal;
detecting speech in the digital audio input signal using a digital signal processor of the digital signal processing chain;
outputting, by the digital signal processing chain if the digital signal processing chain detects speech, a command indicating that human speech has been detected; and
wherein the processing, by the analog voice activity detector, comprises comparing, by analog noise level estimation circuitry comprising a switched capacitance network and a comparator, an energy level of the audio input signal and a noise floor level of the analog audio input signal to a variable signal processing threshold to determine whether the analog audio input signal includes speech, wherein the switched capacitance network comprises a plurality of capacitors and switches, and wherein the switches are operable to adjust the noise floor level based on a comparison of the noise floor level to the energy level.

2. The method of claim 1, wherein the processing, by the analog voice activity detector, further comprises band limiting and amplifying, by a low-power bandpass pre-amplifier, the analog audio input signal to produce a band-limited amplified analog audio signal.

3. The method of claim 2, wherein the low-power bandpass pre-amplifier is one of an active resistor-capacitor (RC) circuit, a gm-C circuit, and a passive RC circuit.

4. The method of claim 3, wherein the processing, by the analog voice activity detector, further comprises
calculating, by an energy estimator, an energy level of the band-limited amplified analog audio signal to produce a voltage sample indicative of a corresponding energy level.

5. The method of claim 4, wherein the calculating, by the energy estimator, the energy level comprises performing a continuous-time nonlinear operation on the band-limited amplified analog audio signal.

6. The method of claim 5, wherein the processing, by the analog voice activity detector, further comprises:
calculating, by the analog noise level estimation circuitry, an estimation of the noise floor level; and
calculating a signal-to-noise (SNR) level of the voltage sample and the noise floor level.

7. The method of claim 1, wherein the comparing includes an estimation of a signal to noise ratio of a sample voltage indicative of the energy level.

8. A system comprising:
an audio input operable to sense sound waves from an environment and generate an analog audio input signal;
a digital signal processing chain operable to process the analog audio input signal to detect speech and output a signal indicating when speech is detected, the digital signal processing chain operable to enter a low power mode after a period of inactivity; and
analog voice activity detection circuitry coupled to the audio input and digital signal processing chain, the analog voice activity detection circuitry operable to process the analog audio input signal to detect speech and generate a wake up command to the digital signal processing chain to awaken the digital signal processing chain from the low power mode when speech is detected by the analog voice activity detection circuitry;
wherein the analog voice activity detection circuitry comprises analog noise level estimation circuitry operable to calculate an estimation of a noise floor level, the analog noise level estimation circuitry comprising a switched capacitance network and a comparator; and
analog signal-to-noise level circuitry operable to compare a signal-to-noise ratio to a variable threshold value.

9. The system of claim 8 wherein the analog voice activity detection circuitry further comprises:
analog energy estimation circuitry operable to receive the analog input audio signal and generate an energy level estimation for a frame of the input audio signal.

10. The system of claim 9, wherein the analog noise level estimation circuitry is coupled to the output of the analog energy estimation circuitry, and wherein the analog noise level estimation circuitry is operable to receive the energy level estimation from the analog energy estimation circuitry and generate an estimated noise level.

11. The system of claim 9, wherein the analog voice activity detection circuitry further comprises voice activity detection logic circuitry coupled to the output of the energy estimation circuitry and the noise level estimation circuitry, the voice activity detection logic comprising analog circuitry operable to receive the energy estimation from the energy estimation circuit and the signal to noise ratio output from the noise level estimation circuitry and generate a signal indicating whether the speech has been detected.

12. The system of claim 8, wherein the analog voice activity detection circuitry further comprises a low-power bandpass pre-amplifier operable to output a band limited, amplified analog audio input signal.

13. The system of claim 12, wherein the low-power bandpass pre-amplifier comprises one of an active resistor-capacitor (RC) circuit, a gm-C circuit, and a passive RC circuit.

14. The system of claim 13, wherein the analog voice activity detection circuitry further comprises analog energy estimation circuitry operable to receive the analog audio input signal and calculate an estimated energy level to produce a voltage sample indicative of a corresponding energy level.

15. A system comprising:
an audio input operable to sense sound waves from an environment and generate an analog audio input signal;
a digital signal processing chain operable to process the analog audio input signal to detect speech and output a signal indicating when speech is detected, the digital signal processing chain operable to enter a low power mode after a period of inactivity; and
analog voice activity detection circuitry coupled to the audio input and digital signal processing chain, the analog voice activity detection circuitry operable to process the analog audio input signal to detect speech and generate a wake up command to the digital signal processing chain to awaken the digital signal processing chain from the low power mode when speech is detected by the analog voice activity detection circuitry;

wherein the analog voice activity detection circuitry comprises analog energy estimation circuitry operable to receive the analog audio input signal and calculate an estimated energy level to produce a voltage sample indicative of a corresponding energy level; and wherein the analog energy estimation circuitry is operable to calculate the energy level by performing a continuous-time nonlinear operation on a band-limited amplified analog audio signal, and wherein the analog voice activity detection circuitry is operable to compare the calculated energy level and a calculated noise floor level of the analog audio input signal to a variable signal processing threshold to determine whether the analog audio input signal includes speech.

16. The system of claim 15, wherein the analog voice activity detection circuitry further comprises:

analog noise level estimation circuitry operable to calculate an estimation of the noise floor level, the analog noise level estimation circuitry comprising a switched capacitance network and a comparator; and analog signal-to-noise level circuitry operable to compare a signal-to-noise ratio to a variable threshold value.

17. The system of claim 16, wherein the switched capacitance network comprises a plurality of capacitors and a plurality of switches, and wherein the switches are operable to adjust the noise floor level based on the comparison of the noise floor level to the calculated energy level.

* * * * *